(12) United States Patent
Owaki

(10) Patent No.: US 11,488,558 B2
(45) Date of Patent: Nov. 1, 2022

(54) DISPLAY DEVICE

(71) Applicant: Japan Display Inc., Tokyo (JP)

(72) Inventor: Yoshio Owaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/469,430

(22) Filed: Sep. 8, 2021

(65) Prior Publication Data

US 2021/0407454 A1 Dec. 30, 2021

Related U.S. Application Data

(63) Continuation of application No. PCT/JP2020/010416, filed on Mar. 11, 2020.

(30) Foreign Application Priority Data

Mar. 12, 2019 (JP) ............................. JP2019-045210

(51) Int. Cl.
*G09G 3/36* (2006.01)
*G06F 3/041* (2006.01)
*G06F 3/044* (2006.01)

(52) U.S. Cl.
CPC ......... *G09G 3/3677* (2013.01); *G06F 3/0412* (2013.01); *G06F 3/0446* (2019.05);
(Continued)

(58) Field of Classification Search
CPC .............. G09G 3/3677; G09G 2310/08; G06F 3/04166; G06F 3/0446; G06F 3/0412
See application file for complete search history.

(56) References Cited

U.S. PATENT DOCUMENTS

2014/0292711 A1 10/2014 Teranishi et al.
2016/0109987 A1 4/2016 Teranishi et al.
(Continued)

FOREIGN PATENT DOCUMENTS

JP 2014-209171 A 11/2014
JP 2018-018156 A 2/2018
(Continued)

OTHER PUBLICATIONS

International Search Report issued in International Patent Application No. PCT/JP2020/010416 dated Jun. 9, 2020 and English translation of same. 5 pages.
(Continued)

*Primary Examiner* — Peter D McLoone
(74) *Attorney, Agent, or Firm* — K&L Gates LLP

(57) ABSTRACT

A display device is configured to alternately execute an operation in a display period and an operation in a detection period in a time division manner. The display device includes: scanning lines; signal lines; a drive electrode; a scanning-line drive circuit; a signal-line drive circuit; a drive-electrode drive circuit configured to supply an alternating-current drive signal to the drive electrode in the detection period; a power circuit configured to generate a first potential for a high potential of each scanning signal and a second potential for a low potential of each scanning signal; a first-potential supply line; and a second-potential supply line. A potential supply period is included in a low-potential period of the drive signal, the potential supply period being a period in which the first potential is supplied to the first-potential supply line and the second potential is supplied to the second-potential supply line.

6 Claims, 16 Drawing Sheets

(52) U.S. Cl.
CPC ....... *G06F 3/04166* (2019.05); *G09G 3/3696* (2013.01); *G09G 2310/08* (2013.01)

(56) References Cited

U.S. PATENT DOCUMENTS

| | | |
|---|---|---|
| 2017/0090621 A1 | 3/2017 | Kang et al. |
| 2017/0102807 A1 | 4/2017 | Teranishi et al. |
| 2018/0024678 A1 | 1/2018 | Nitobe et al. |
| 2018/0107309 A1 | 4/2018 | Endo et al. |
| 2018/0348950 A1 | 12/2018 | Nakanishi et al. |
| 2020/0097115 A1 | 3/2020 | Nitobe et al. |
| 2020/0342196 A1* | 10/2020 | Chang .................. G09G 3/3655 |
| 2021/0081640 A1* | 3/2021 | Chang .................. G06F 3/0412 |

FOREIGN PATENT DOCUMENTS

| | | |
|---|---|---|
| JP | 2018-067316 A | 4/2018 |
| JP | 2018-206083 A | 12/2018 |
| KR | 10-20170105179 A | 9/2017 |

OTHER PUBLICATIONS

Written Opinion issued in International Patent Application No. PCT/JP2020/010416 dated Jun. 9, 2020. 4 pages.

\* cited by examiner

FIG.4A
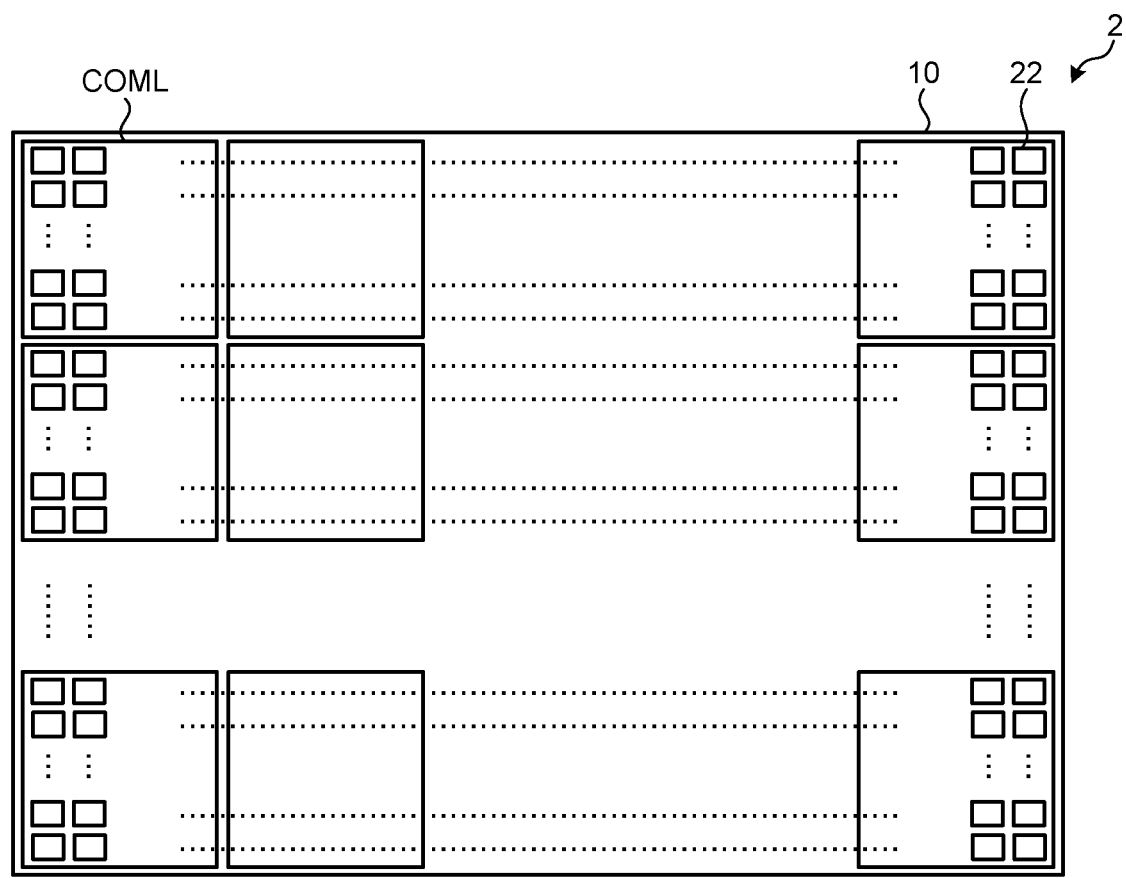
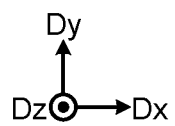

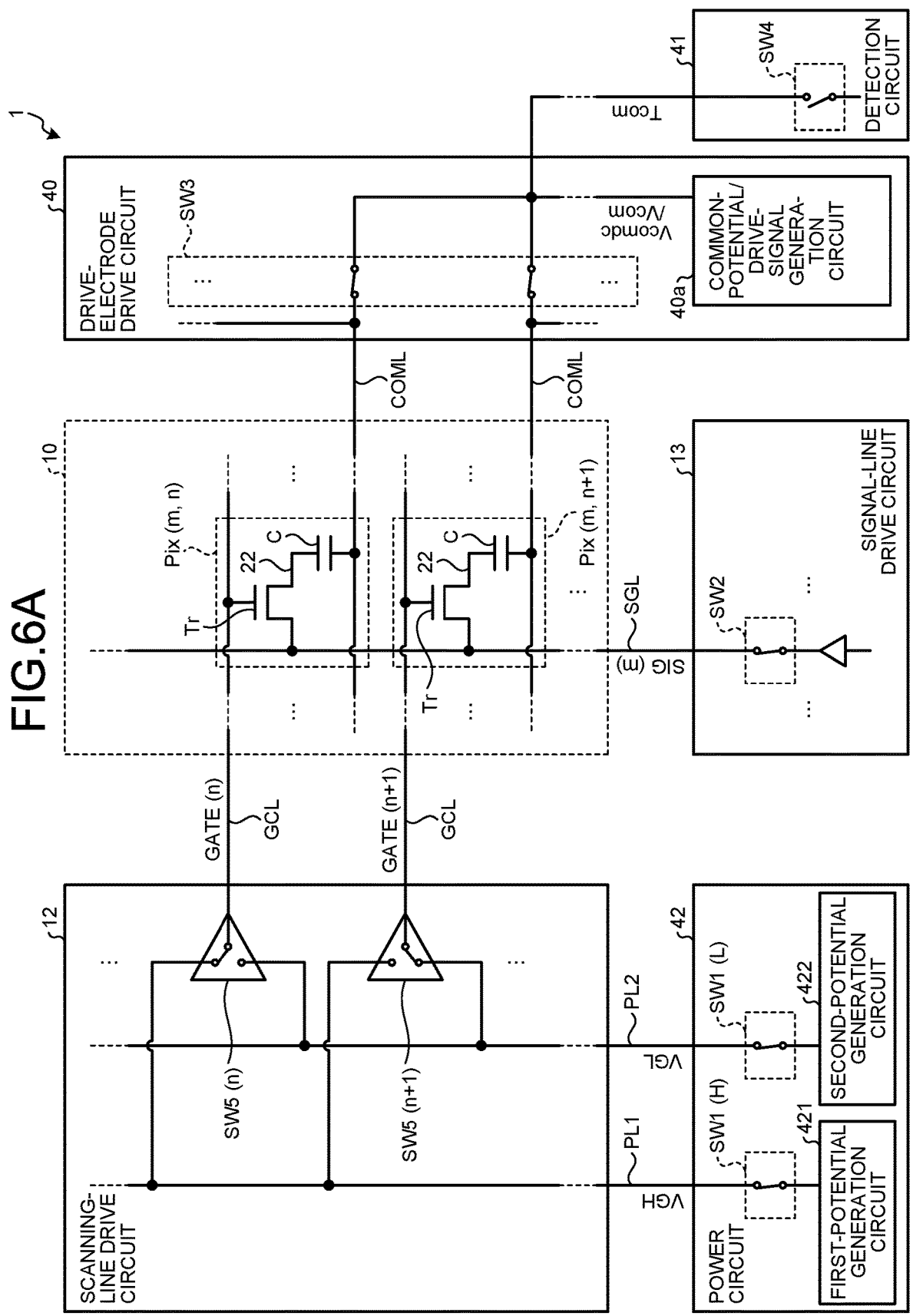

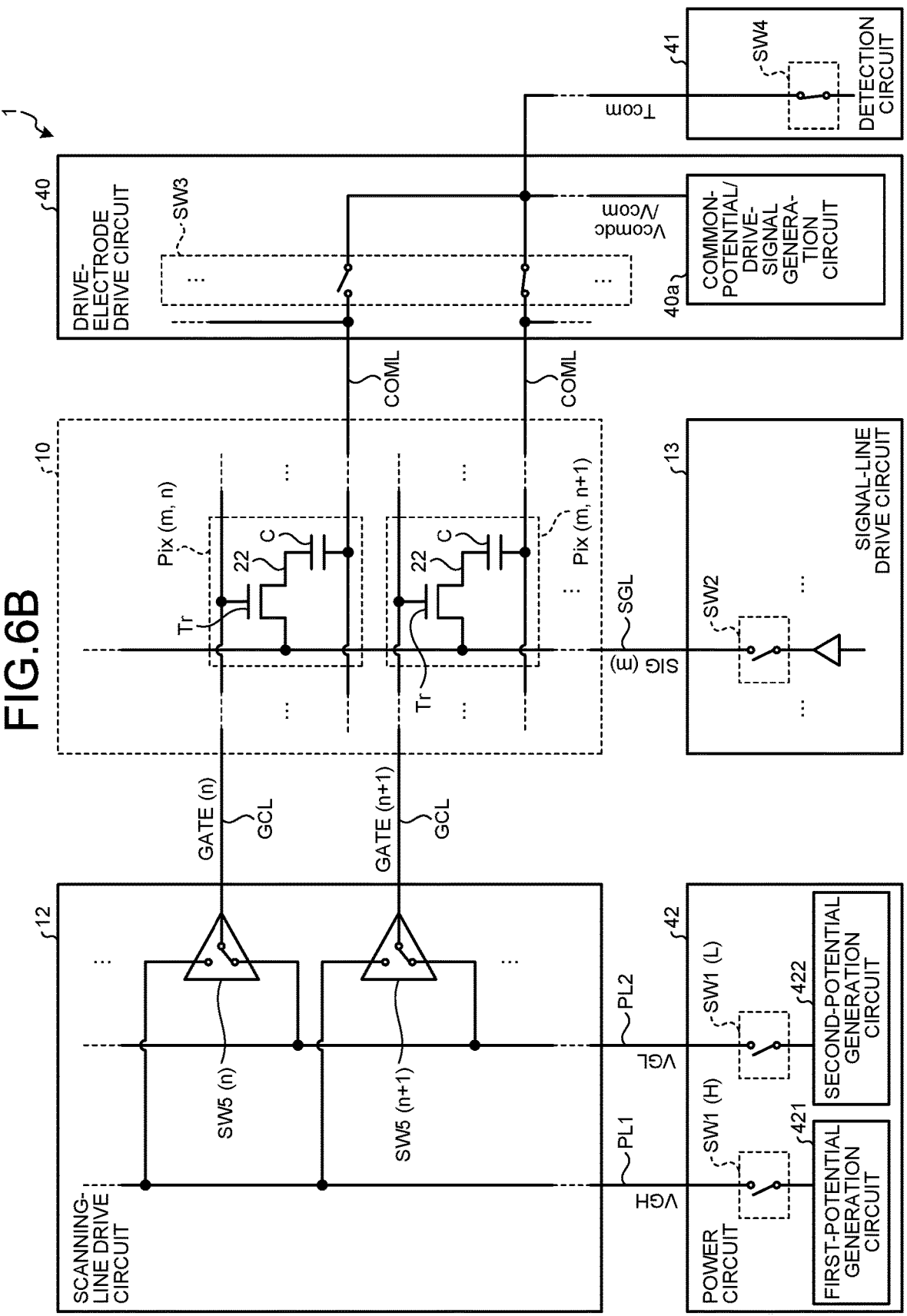

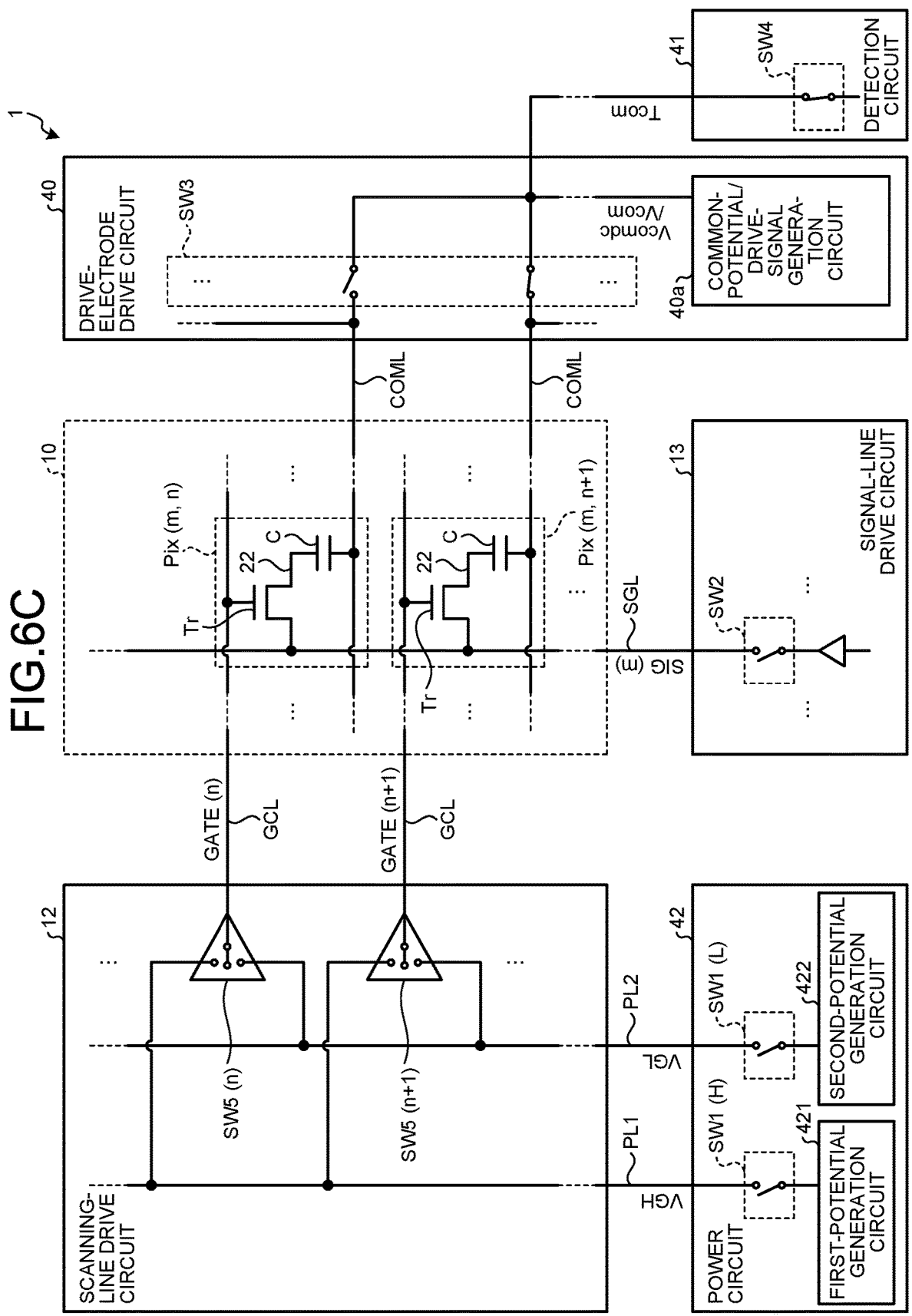

DISPLAY DEVICE

CROSS-REFERENCE TO RELATED APPLICATION

This application claims the benefit of priority from Japanese Patent Application No. 2019-045210 filed on Mar. 12, 2019 and International Patent Application No. PCT/JP2020/010416 filed on Mar. 11, 2020, the entire contents of which are incorporated herein by reference.

BACKGROUND

1. Technical Field

What is disclosed herein relates to a display device.

2. Description of the Related Art

Recently, touch detection devices called touch panels and capable of detecting an external proximity object have been attracting attention. Such a touch panel is mounted on or integrated with a display device such as a liquid crystal display device and used as a display device. In what is called an in-cell configuration in which a touch panel is integrated with a display device, some electrodes in a display region are used for both of display drive and touch detection, and the display drive and the touch detection are performed in a time division manner. For example, a disclosed configuration includes a plurality of common electrodes that are supplied with display reference voltage in a display drive period and that function as sensor electrodes in a touch detection period (for example, Japanese Patent Application Laid-open Publication No. 2018-67316).

In the in-cell configuration, a scanning line and a signal line as well as the common electrodes are provided in the display region. In the touch detection period, when the potentials of the scanning line and the signal line are fixed, the supply of a detection drive signal to the common electrodes changes on-resistance of a pixel transistor and, whereby electric charge stored in a pixel capacitor in a display period varies. To avoid this, a configuration to set the scanning line and the signal line to high impedance in the touch detection period can be considered. However, as time elapses in the touch detection period, electric charge stored in interlayer capacitors of the scanning line and the signal line is discharged through an interlayer resistor or the like. This causes decrease in off-resistance of the pixel transistor, whereby, electric charge stored in the pixel capacitor potentially is discharged. Furthermore, the potential of the scanning line and the signal line decreases, and thus desired voltage is not applied to the scanning line when a transition to the display period is made, whereby a flicker, a luminance line along the scanning line, or the like potentially occurs.

SUMMARY

According to an aspect, a display device is configured to alternately execute an operation in a display period and an operation in a detection period in a time division manner, the display period being a period in which image display is performed in a display region provided with a plurality of pixels each including a pixel electrode and a pixel transistor, the detection period being a period in which a detection target on the display region is detected. The display device includes: scanning lines coupled to gates of the pixel transistors; signal lines coupled to either sources or drains of the pixel transistors; a drive electrode has pixel capacitors between the drive electrode and the pixel electrodes, the pixel electrodes being coupled to the other ones of the sources and drains of the pixel transistors; a scanning-line drive circuit configured to supply scanning signals to the scanning lines; a signal-line drive circuit configured to supply pixel signals to the signal lines; a drive-electrode drive circuit configured to supply, to the drive electrode, a common potential common to the pixel electrodes in the display period and supply an alternating-current drive signal to the drive electrode in the detection period; a power circuit configured to generate a first potential as a reference potential for a high potential of each scanning signal and a second potential as a reference potential for a low potential of each scanning signal, and supply the first potential and the second potential to the scanning-line drive circuit; a first-potential supply line through which the first potential is supplied to the scanning-line drive circuit; and a second-potential supply line through which the second potential is supplied to the scanning-line drive circuit. The power circuit operates such that a potential supply period is included in a low-potential period of the drive signal, the potential supply period being a period in which the first potential is supplied to the first-potential supply line and the second potential is supplied to the second-potential supply line.

BRIEF DESCRIPTION OF THE DRAWINGS

FIG. 4A is a plan view of a first example schematically illustrating a first substrate included in the display device according to the embodiment;

FIG. 6A is a state diagram of the display device according to the embodiment in the display period;

FIG. 6B is a first state diagram of the display device according to the embodiment when a first-potential supply line and a second-potential supply line are caused to be in a floating state in the detection period;

FIG. 6C is a second state diagram of the display device according to the embodiment when the first-potential supply line and the second-potential supply line are caused to be in a floating state in the detection period;

DETAILED DESCRIPTION

Figure 1:
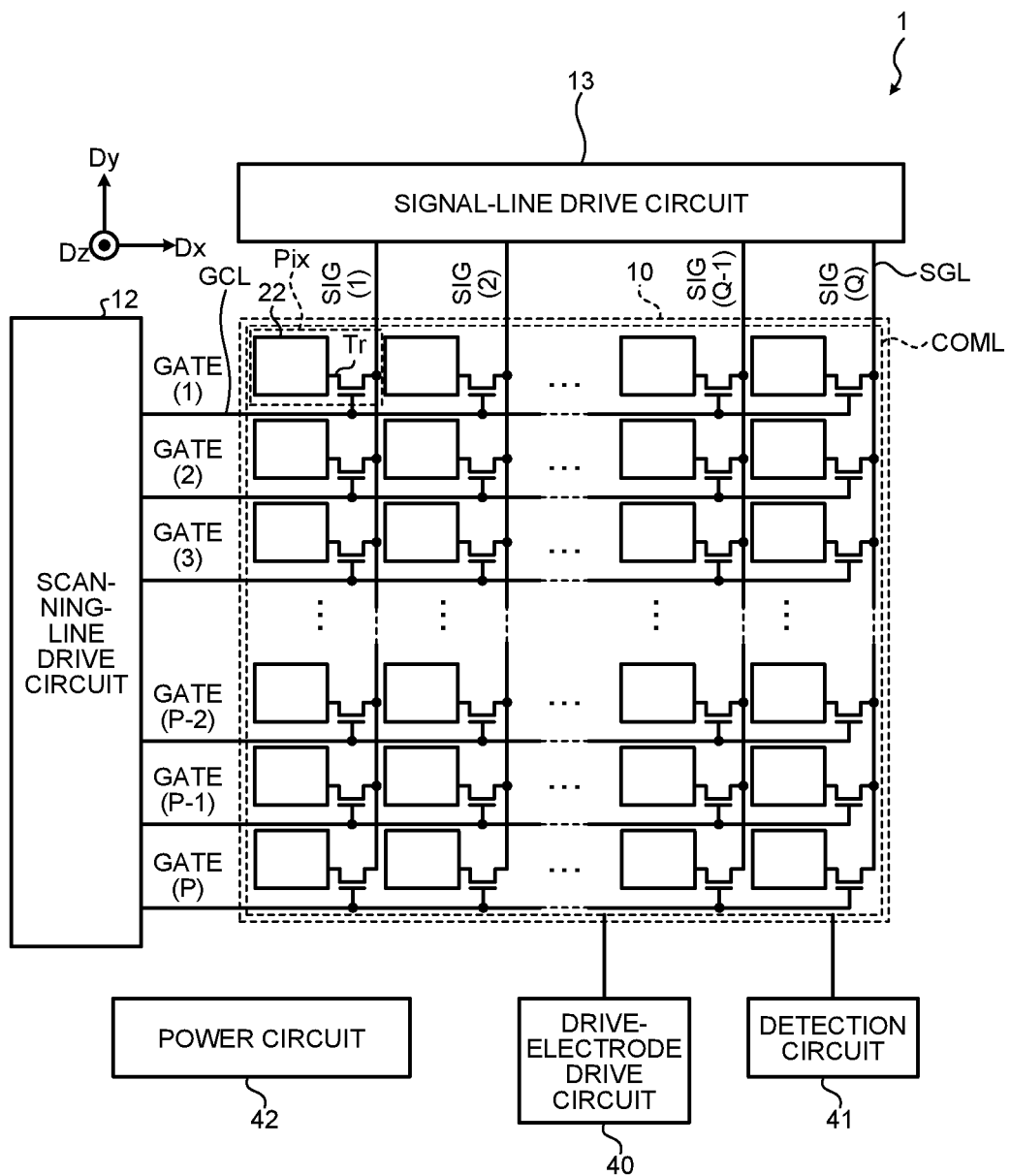
FIG. 1 is a block diagram illustrating an exemplary schematic configuration of a display device according to an embodiment.

An aspect (embodiment) for carrying out the present disclosure will be described below in detail with reference to the accompanying drawings. The present disclosure is not limited by contents described in the embodiment below. Components described below include those that can be easily thought of by the skilled person in the art and those that are identical in effect. In addition, components described below may be combined as appropriate. The present disclosure is merely an example and the scope of the present disclosure includes modifications that can be easily conceived by the skilled person in the art as appropriate without departing from the scope of the disclosure. For clearer description, the drawings schematically illustrate the width, thickness, shape, and the like of each component as compared to actual aspects thereof in some cases, but they are merely examples and do not limit interpretation of the present disclosure. In the present specification and the drawings, any element that is the same as that already described with reference to a drawing is denoted by the same reference numeral, and detailed description thereof is omitted as appropriate.

In this disclosure, when an element is described as being "on" another element, the element can be directly on the other element, or there can be one or more elements between the element and the other element.

FIG. 1 is a block diagram illustrating an exemplary schematic configuration of a display device according to the embodiment. As illustrated in FIG. 1, a display device 1 includes a display region 10 for displaying an image, a scanning-line drive circuit 12, a signal-line drive circuit 13, a drive-electrode drive circuit 40, a detection circuit 41, and a power circuit 42.

The display device 1 according to the present embodiment is what is called an in-cell device integrated with a capacitive touch sensor. Built-in integration of the capacitive touch sensor includes, for example, a configuration in which some members such as a substrate and an electrode in the display region 10 are also used as some members such as a substrate and an electrode that are used as a touch sensor.

A plurality of pixels Pix arranged in a row direction (Dx direction) and a column direction (Dy direction) are provided in the display region 10. The pixels Pix are disposed across the entire display region 10 although only some pixels Pix are illustrated in FIG. 1. The present embodiment exemplifies a configuration using a liquid crystal display element as a display element, but the present disclosure is not limited by the aspect of the display element.

Each pixel Pix includes a pixel electrode 22 and a pixel transistor Tr. The pixel transistor Tr is formed with a thin film transistor and is formed with, for example, an n-channel or p-channel metal-oxide-semiconductor (MOS) TFT. One of the source and drain of the pixel transistor Tr is coupled to a corresponding one of signal lines SGL, the gate thereof is coupled to a corresponding one of scanning lines GCL, and the other of the source and drain is coupled to the pixel electrode 22.

Each pixel Pix is coupled to other pixels Pix through a corresponding one of the scanning lines GCL extending in the row direction (Dx direction). The scanning lines GCL are coupled to the scanning-line drive circuit 12 and supplied with scanning signals GATE(1, 2, . . . , or P) from the scanning-line drive circuit 12.

Each pixel Pix is also coupled to other pixels Pix through a corresponding one of the signal lines SGL extending in the column direction (Dy direction). The signal lines SGL are coupled to the signal-line drive circuit 13 and supplied with pixel signals SIG(1, 2, . . . , or Q) from the signal-line drive circuit 13.

The scanning-line drive circuit 12 is a circuit configured to supply the scanning signals GATE(1, 2, . . . , and P) to the gates of the pixel transistors Tr of the pixels Pix on the rows 1, 2, . . . , and P through the scanning lines GCL. In the present embodiment, the scanning-line drive circuit 12 generates each scanning signal GATE by switching between a first potential and a second potential, which are supplied from the power circuit 42, to be output to the scanning line GCL. Components for switching between the first potential and the second potential to be output to each scanning line GCL may be switch circuits (SW5($n$) and SW5($n$+1)) including, for example, shift registers.

The signal-line drive circuit 13 is a circuit configured to supply the pixel signals SIG(1, 2, . . . , and Q) to the sources of the pixel transistors Tr of the pixels Pix through the signal lines SGL. The signal-line drive circuit 13 supplies, simultaneously or in a time division manner, the pixel signals SIG(1, 2, . . . , and Q) to the pixels Pix on the rows 1, 2, . . . , and P. The signal-line drive circuit 13 has a function to set the signal lines SGL to high impedance (Hi-Z). A component for setting the signal lines SGL to high impedance (Hi-Z) may be, for example, a switch circuit (SW2) including a multiplexer or the like.

The display device 1 according to the present embodiment has, as operation modes, a display mode in which image display is performed in the display region 10 and a detection mode in which touch detection is performed. In the present disclosure, touch detection is detection of the position and motion of a detection target in a state in which the detection target is in contact with a display surface or so close to the display surface that it can be identified as being in contact with the display surface.

A drive electrode COML is provided in the display region 10. The drive electrode COML is provided in a region inside a dashed line overlapping with the display region 10 in a direction (Dz direction) orthogonal to the row direction (Dx direction) and the column direction (Dy direction).

The drive-electrode drive circuit 40 is a circuit configured to supply, to the drive electrode COML, a common potential Vcomdc common to each pixel electrode 22 in the display mode. The drive-electrode drive circuit 40 is also a circuit configured to sequentially supply a touch detection drive signal Vcom to the drive electrode COML in the detection mode. The drive-electrode drive circuit 40 includes a common-potential/drive-signal generation circuit 40*a* configured to generate the common potential Vcomdc or the drive signal Vcom. A component for switching between the output of the common potential Vcomdc and the output of the drive signal Vcom may be, for example, a switch circuit (SW3).

When image display is performed in the display region 10, the drive-electrode drive circuit 40 supplies, to the drive electrode COML, the common potential Vcomdc common to each pixel electrode 22. Thus, the drive electrode COML functions as a common electrode for each pixel electrode 22 when image display is performed in the display region 10.

When touch detection is performed, the drive-electrode drive circuit 40 sequentially supplies the drive signal Vcom to the drive electrode COML. Thus, the drive electrode COML functions as a sensor electrode when touch detection is performed.

A detection signal Tcom supplied from the drive electrode COML is sequentially input to the detection circuit 41 in the detection mode. The detection circuit 41 performs, based on the input detection signal Tcom, touch detection operation on the fundamental principle of capacitive touch detection to be described later. A component for acquiring the detection signal Tcom in the detection mode may be, for example, a switch circuit (SW4).

The scanning-line drive circuit 12, the signal-line drive circuit 13, and the detection circuit 41 may be configured as individual devices (IC) or may be configured as one device or a plurality of devices (IC) in which the above-described functions are integrated. The present disclosure is not limited by the configurations of the scanning-line drive circuit 12, the signal-line drive circuit 13, and the detection circuit 41.

The power circuit 42 is a power source generation circuit configured to generate various kinds of power voltage to be provided to the scanning-line drive circuit 12, the signal-line drive circuit 13, and the detection circuit 41 included in the display device 1 according to the present embodiment. In the present embodiment, the power circuit 42 generates the first potential as a reference potential for a high potential of each scanning signal GATE, and the second potential as a reference potential for a low potential thereof, and supplies the first potential and the second potential to the scanning-line drive circuit 12. In the present embodiment, the power circuit 42 has a function to set, to high impedance (Hi-Z), a first-potential supply line serving as a supply path of the first potential and a second-potential supply line serving as a supply path of the second potential. Components for setting the first-potential supply line and the second-potential supply line to high impedance (Hi-Z) may be, for example, switch circuits (SW1(H) and SW1(L)). The first-potential supply line and the second-potential supply line will be described later.

Figure 2:
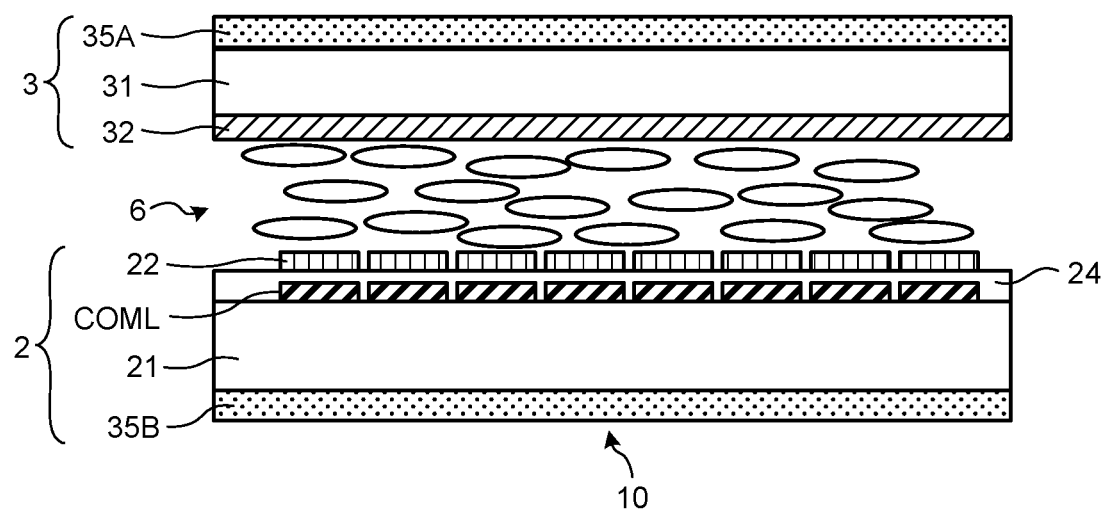
FIG. 2 is a first cross-sectional view illustrating a schematic sectional structure of a display region.
Figure 3:
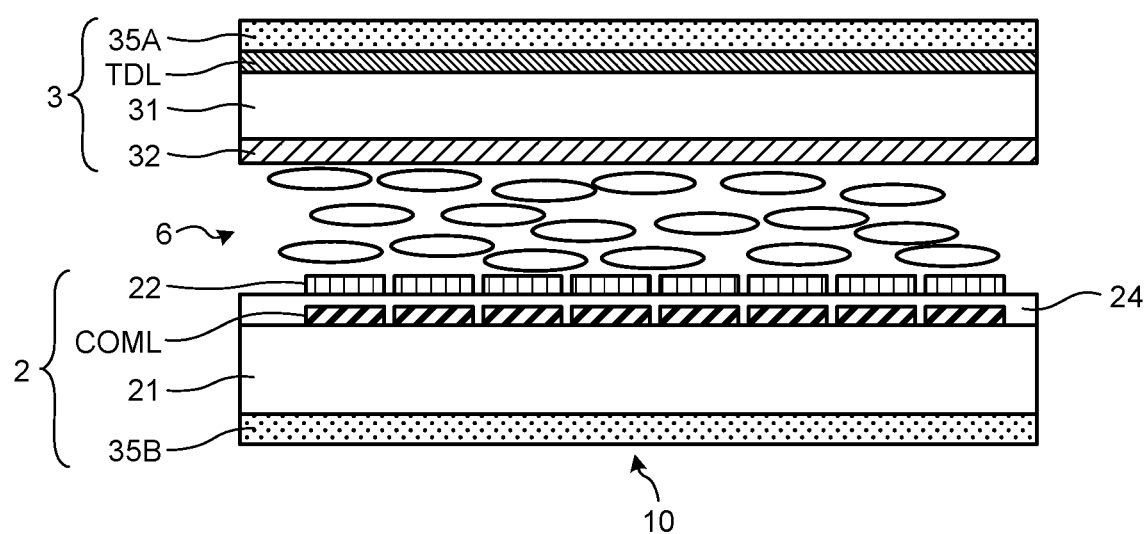
FIG. 3 is a second cross-sectional view illustrating a schematic sectional structure of the display region.
Figure 4B:
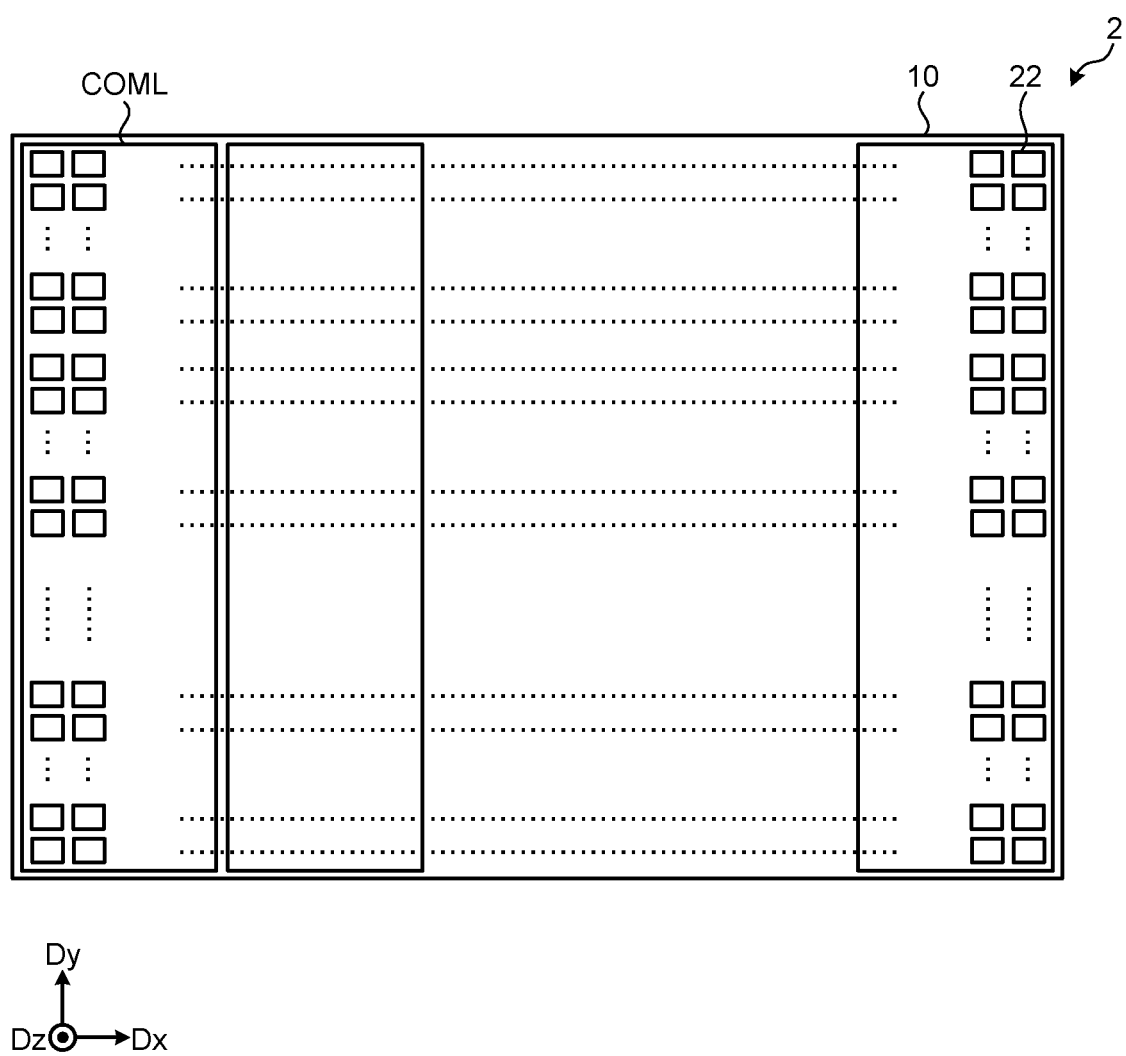
FIG. 4B is a plan view of a second example schematically illustrating the first substrate included in the display device according to the embodiment.
Figure 4C:
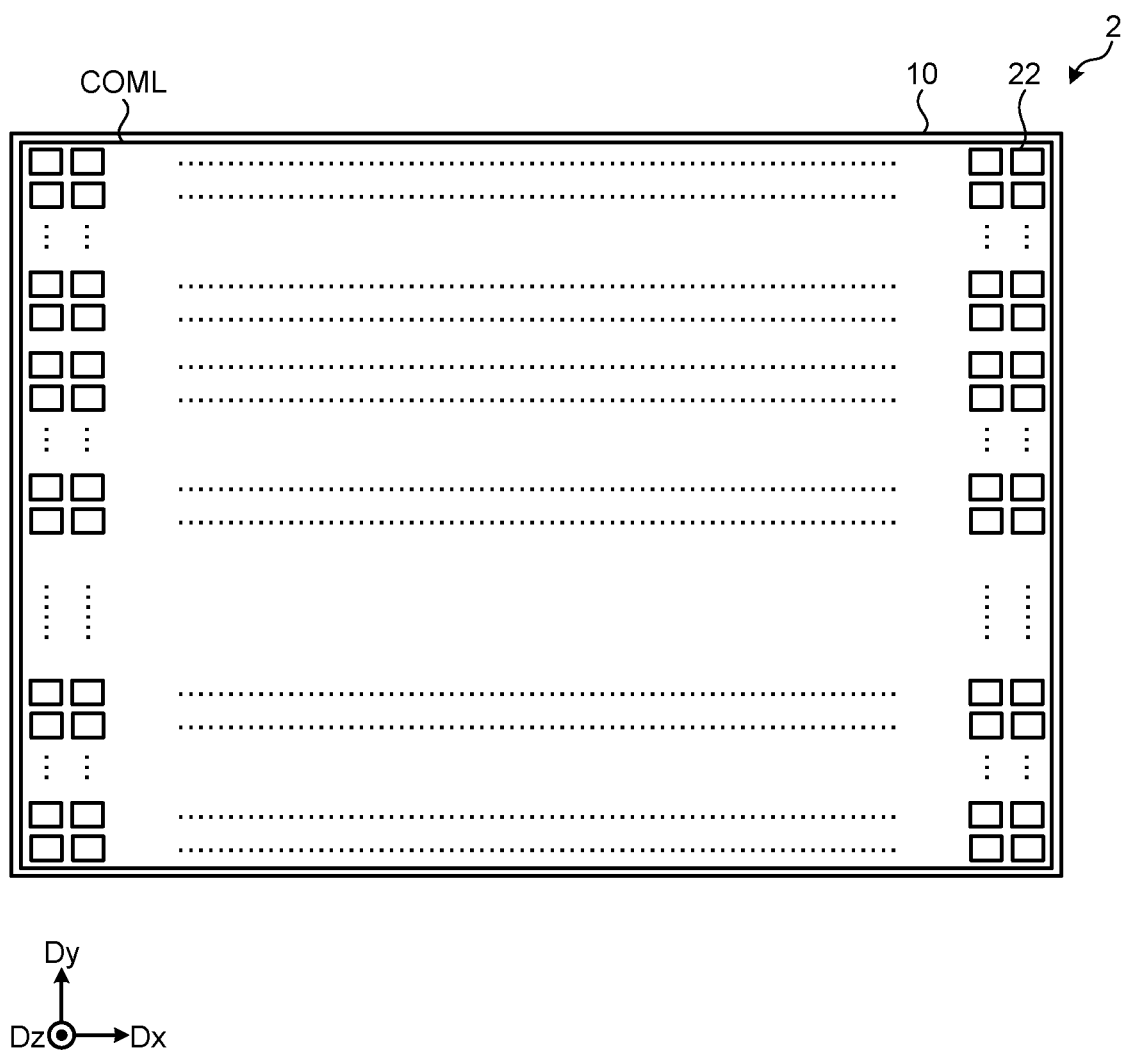
FIG. 4C is a plan view of a third example schematically illustrating the first substrate included in the display device according to the embodiment.

FIG. 2 is a first cross-sectional view illustrating a schematic sectional structure of the display region. FIG. 3 is a second cross-sectional view illustrating a schematic sectional structure of the display region. FIG. 4A is a plan view of a first example schematically illustrating a first substrate included in the display device according to the embodiment. FIG. 4B is a plan view of a second example schematically illustrating the first substrate included in the display device according to the embodiment. FIG. 4C is a plan view of a third example schematically illustrating the first substrate included in the display device according to the embodiment.

As illustrated in FIG. 2, the display device 1 includes an array substrate 2, a counter substrate 3 disposed opposite to the array substrate 2 in a direction orthogonal to the surface of the array substrate 2, and a liquid crystal layer 6 interposed between the array substrate 2 and the counter substrate 3.

As illustrated in FIGS. 2 and 3, the array substrate 2 includes a first substrate 21, a plurality of pixel electrodes 22, a plurality of drive electrodes COML, and an insulation layer 24 insulating the pixel electrodes 22 from the drive electrodes COML. The plurality of pixel electrodes 22 are disposed in a row-column configuration (matrix) above the first substrate 21. The drive electrodes COML are provided between the first substrate 21 and the pixel electrodes 22. A polarization plate 35B is provided on the lower side of the first substrate 21 through a bonding layer (not illustrated). The first substrate 21 is provided with a switching element such as a thin film transistor (TFT) and various wiring lines such as the scanning lines GCL and the signal lines SGL.

As illustrated in FIGS. 4A to 4C, at least one drive electrode COML is provided in the display region 10 of the first substrate 21. The drive electrode COML functions as a detection electrode in self-capacitance touch detection. In the first example illustrated in FIG. 4A, a plurality of drive electrodes COML are disposed in the display region 10. More specifically, the plurality of drive electrodes COML are arranged and disposed in a matrix having a row-column configuration in each of a direction (Dx direction) along a long side of the display region 10 and a direction (Dy direction) along a short side of the display region 10. Each drive electrode COML is substantially square in plan view. The drive electrodes COML are made of, for example, a translucent conductive material such as indium tin oxide (ITO). More than one pixel electrode 22 is disposed in a row-column configuration at positions corresponding to each drive electrode COML. Each pixel electrode 22 has an area smaller than that of the one drive electrode COML. The drive electrodes COML and the pixel electrodes 22 are disposed across the entire display region 10 although FIG. 4A illustrates only some drive electrodes COML and pixel electrodes 22. Alternatively, as in the second example illustrated in FIG. 4B, a plurality of drive electrodes COML may extend in the direction (Dy direction) along the short side of the display region 10 and may be arranged in the direction (Dx direction) along the long side of the display region 10. Alternatively, although not illustrated, the drive electrodes COML may extend in the direction (Dx direction) along the long side of the display region 10 and may be arranged in the direction (Dy direction) along the short side thereof. Alternatively, as in the third example illustrated in FIG. 4C, one drive electrode COML may be provided across the entire display region 10.

As illustrated in FIG. 2, the counter substrate 3 includes a second substrate 31, and a color filter 32 formed on one surface of the second substrate 31. A polarization plate 35A is provided above the color filter 32 with a bonding layer (not illustrated) therebetween.

Alternatively, as illustrated in FIG. 3, the counter substrate 3 may include the second substrate 31, the color filter 32 formed on one surface of the second substrate 31, a detection electrode TDL provided on the other surface of the second substrate 31, and a polarization plate 35A. A plurality of the detection electrodes TDL are arrayed on the second substrate 31, intersecting the drive electrodes COML in plan view. Each detection electrode TDL functions as a detection electrode in mutual capacitive touch detection.

In the present embodiment, each detection electrode TDL is made of, for example, a translucent conductive material such as ITO. Alternatively, the detection electrode TDL may be formed of a metal thin line patterned in a mesh shape, a zigzag line shape, a wavy line shape, or a straight line shape. In this case, the detection electrode TDL is formed as a metal layer of at least one kind material selected from aluminum (Al), copper (Cu), silver (Ag), molybdenum (Mo), chromium (Cr), and tungsten (W).

The first substrate 21 and the second substrate 31 are disposed opposite to each other with a certain gap therebetween. The liquid crystal layer 6 is provided as a display functional layer in a space between the first substrate 21 and the second substrate 31. The liquid crystal layer 6 modulates light passing through the liquid crystal layer 6 in accordance with the state of electric field and is made of, for example, liquid crystal of a horizontal electric field mode such as in-plane switching (IPS) including fringe field switching (FFS). An orientation film may be disposed between the liquid crystal layer 6 and the array substrate 2 and between the liquid crystal layer 6 and the counter substrate 3.

The pixel transistors Tr of the pixels Pix and wiring such as the signal lines SGL for supplying the pixel signals SIG to the pixel electrodes 22 and the scanning lines GCL for supplying the scanning signals GATE to drive the pixel transistors Tr, are formed on the first substrate 21. The signal lines SGL and the scanning lines GCL extend on a plane parallel to the surface of the first substrate 21.

Figure 5:
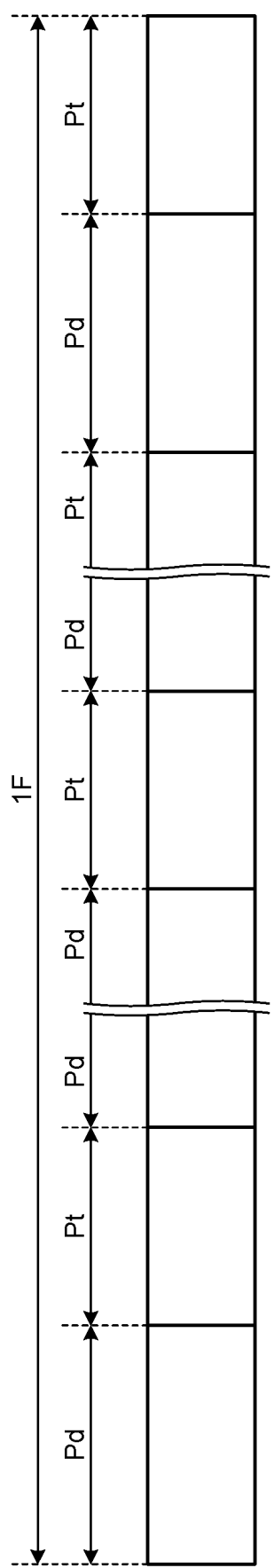
FIG. 5 is a diagram illustrating exemplary time division of a display period and a detection period in the display device according to the embodiment.

FIG. 5 is a diagram illustrating exemplary time division of a display period and a detection period in the display device according to the embodiment.

In the present embodiment, an operation in a display period Pd in which the display device operates in the display mode and an operation in a detection period Pt in which the display device operates in the detection mode are alternately executed in a time division manner. In the example illustrated in FIG. 5, one frame period 1F is divided into a plurality of the display periods Pd, and each pair of display periods Pd has a detection period Pt interposed therebetween.

FIG. 6A is a state diagram of the display device according to the embodiment in the display period. FIG. 6B is a first state diagram of the display device according to the embodiment when the first-potential supply line and the second-potential supply line are caused to be in a floating state in the detection period. FIG. 6C is a second state diagram of the display device according to the embodiment when the first-potential supply line and the second-potential supply line are caused to be in a floating state in the detection period. FIGS. 6A to 6C exemplarily illustrate a pixel Pix(m, n) at the n-th row and the m-th column and a pixel Pix(m, n+1) at the (n+1)-th row and the m-th column in the display region 10.

First, the operation in the display period Pd will be described below with reference to FIG. 6A.

In the display period Pd, the scanning-line drive circuit 12 sequentially selects each scanning line GCL. The scanning-line drive circuit 12 applies the scanning signal GATE to the gate of the pixel transistor Tr of each corresponding pixel Pix through the selected scanning line GCL. Thus, one row (one horizontal line) of the pixels Pix is sequentially selected as a display drive target. In the example illustrated in FIG. 6A, a first potential VGH applied from a first-potential generation circuit 421 of the power circuit 42 to a first-potential supply line PL1 through the switch circuit SW1(H) is applied as the high potential of a scanning signal GATE(n) through the switch circuit SW5(n) of the scanning-line drive circuit 12. Thus, one horizontal line including the pixel Pix(m, n) is selected as a display drive target.

In this case, a second potential VGL applied from a second-potential generation circuit 422 of the power circuit 42 to a second-potential supply line PL2 through the switch circuit SW1(L) is applied as the low potential of a scanning signal GATE(n+1) to the gate of the pixel transistor Tr of the pixel Pix(m, n+1), which is not selected as a display drive target, through the switch circuit SW5(n+1) of the scanning-line drive circuit 12.

The signal-line drive circuit 13 supplies the pixel signals SIG corresponding to the pixels Pix included in the selected one horizontal line. In the example illustrated in FIG. 6A, a pixel signal SIG(m) is supplied to the pixel Pix(m, n), which is selected as a display drive target, through the switch circuit SW2 of the signal-line drive circuit 13.

When display operation is performed, the drive-electrode drive circuit 40 applies the common potential Vcomdc common to the pixel electrodes 22 simultaneously to the drive electrodes COML through the switch circuit SW3. Thus, the drive electrodes COML function as common electrodes for the pixel electrodes 22 in display operation, and a pixel capacitor C is formed between the drive electrode COML and the pixel electrode 22. The pixel capacitor C stores electric charge in accordance with the pixel signal SIG(m).

Subsequently, the operation in the detection period Pt will be described below with reference to FIGS. 6B and 6C.

In the detection period Pt, the switch circuit SW1(H) of the power circuit 42 sets the first-potential supply line PL1 to high impedance (Hi-Z). In addition, the switch circuit SW1(L) of the power circuit 42 sets the second-potential supply line PL2 to high impedance (Hi-Z). With this operation, the first-potential supply line PL1 and the second-potential supply line PL2 are brought into a floating state, and each scanning line GCL coupled to the scanning-line drive circuit 12 is brought into a floating state as well. As illustrated in FIG. 6C, in the detection period Pt, each scanning line GCL may be brought into a floating state by setting the scanning line GCL to high impedance (Hi-Z).

The switch circuit SW2 of the signal-line drive circuit 13 sets the signal lines SGL to high impedance (Hi-Z). With this operation, the signal lines SGL are brought into a floating state.

In this state, the drive-electrode drive circuit 40 sequentially supplies the drive signal Vcom to each drive electrode COML through the switch circuit SW3. Thus, the drive electrode COML functions as a sensor electrode in detection operation.

The touch detection operation of the detection circuit 41 will be described below. The display device 1 performs touch control based on the fundamental principle of capacitive touch detection. In the present embodiment, the detection circuit 41 performs touch detection by using what is called a self-capacitance touch detection method. Specifically, the detection circuit 41 performs touch detection based on capacitance generated between each drive electrode COML and a detection target.

Figure 7:
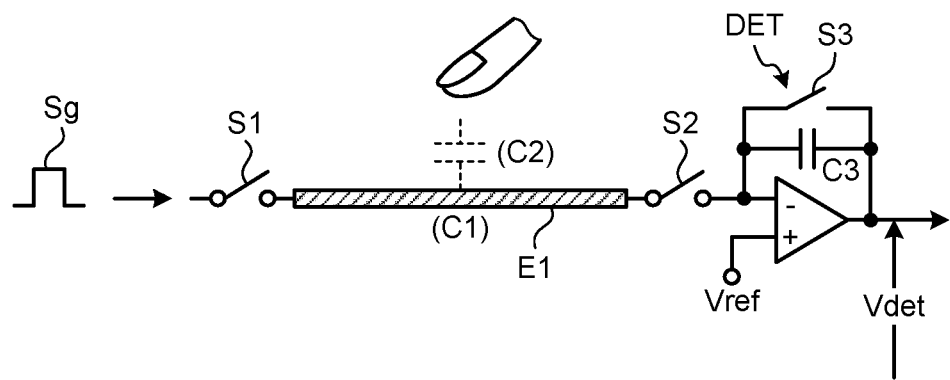
FIG. 7 is a schematic diagram illustrating the fundamental principle of self-capacitance touch detection.
Figure 8:
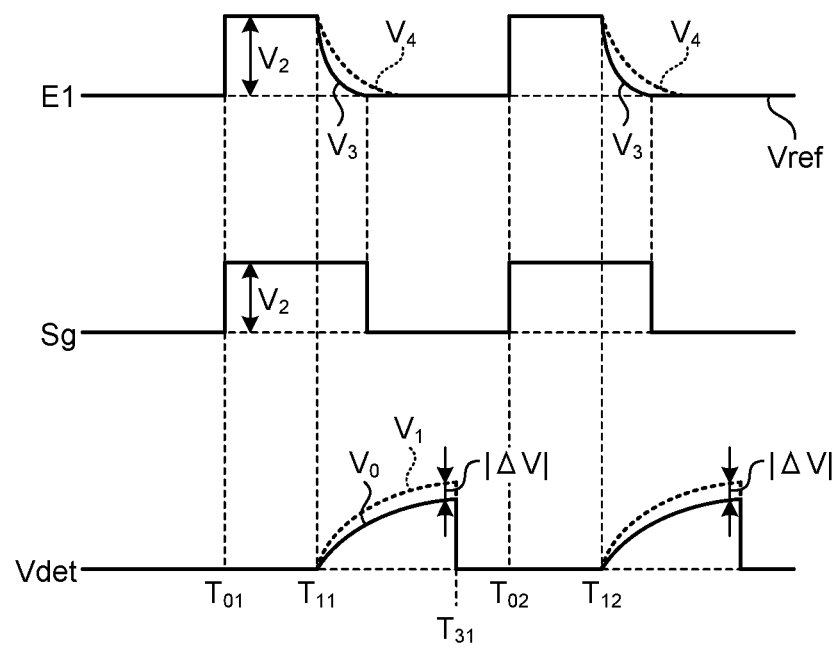
FIG. 8 is a diagram illustrating exemplary waveforms in self-capacitance touch detection.

FIG. 7 is a schematic diagram illustrating the fundamental principle of self-capacitance touch detection. FIG. 8 is a diagram illustrating exemplary waveforms in self-capacitance touch detection. FIG. 7 also illustrates a partial configuration of the detection circuit 41. The detection target is a finger in the example illustrated in FIG. 7, but is not limited to a finger and may be an object, such as a stylus pen, containing a conductor. A circuit illustrated in FIG. 7 is provided in the detection circuit 41 illustrated in FIGS. 6A to 6C. A detection electrode E1 corresponds to the drive electrode COML. In other words, in the example illustrated in FIG. 7, an alternating-current square wave Sg corresponds to the drive signal Vcom supplied to the drive electrode COML in detection operation.

The alternating-current square wave Sg with a predetermined frequency (for example, several kHz to several hundred kHz) is applied to the detection electrode E1. The detection electrode E1 has capacitance C1, and current flows in accordance with the capacitance C1. A voltage detector DET converts current variation in accordance with the alternating-current square wave Sg into voltage variation (a waveform $V_0$ illustrated with a solid line (refer to FIG. 8)).

Subsequently, as illustrated in FIG. 7, capacitance C2 between the finger and the detection electrode E1 is added to the capacitance C1 of the detection electrode E1 in a state in which the detection target is present. Thus, when the alternating-current square wave Sg is applied to the detection electrode E1, current flows in accordance with the capacitance C1 and the capacitance C2. As illustrated in FIG. 8, the voltage detector DET converts current variation in accordance with the alternating-current square wave Sg into voltage variation (a waveform $V_1$ illustrated with a dotted line). Then, the presence of the detection target is determined based on the absolute value $|\Delta V|$ of difference between the waveform $V_0$ and the waveform $V_1$.

Specifically, in FIG. 8, the alternating-current square wave Sg increases to a voltage level corresponding to voltage $V_2$ at the timing of time $T_{01}$. At this time, a switch S1 is turned on and a switch S2 is turned off, whereby the potential of the detection electrode E1 increases to the voltage $V_2$ as well. Subsequently, the switch S1 is turned off before the timing of time $T_{11}$. At this time, the detection electrode E1 is in a floating state, but the potential of the detection electrode E1 is maintained at $V_2$ by the capacitance C1 (or C1+C2; refer to FIG. 7) of the detection electrode E1. In addition, reset operation of the voltage detector DET is performed before the timing of time $T_{11}$.

Subsequently, when the switch S2 is turned on at the timing of time $T_{11}$, electric charge accumulated in the capacitor C1 (or C1+C2) of the detection electrode E1 moves to a capacitor C3 in the voltage detector DET, whereby output of the voltage detector DET increases (refer to a detection signal Vdet in FIG. 8). When detection target is not present, the output (detection signal Vdet) of the voltage detector DET is the waveform $V_0$, which is illustrated with a solid line, and Vdet=C1×$V_2$/C3 is obtained. When the detection target is present, the output is the waveform $V_1$, which is illustrated with a dotted line, and Vdet=(C1+C2)×$V_2$/C3 is obtained.

Thereafter, at the timing of time $T_{31}$, the switch S2 is turned off and the switch S1 and a switch S3 are turned on so that the potential of the detection electrode E1 becomes a low level equipotential to the alternating-current square wave Sg and the voltage detector DET is reset. The above-described operation is repeated at a predetermined frequency (for example, several kHz to several hundred kHz). In this manner, the detection circuit 41 can detect a state in which a detection target is present based on the fundamental principle of detection of the detection target by the self-capacitance touch detection method.

Figure 9:
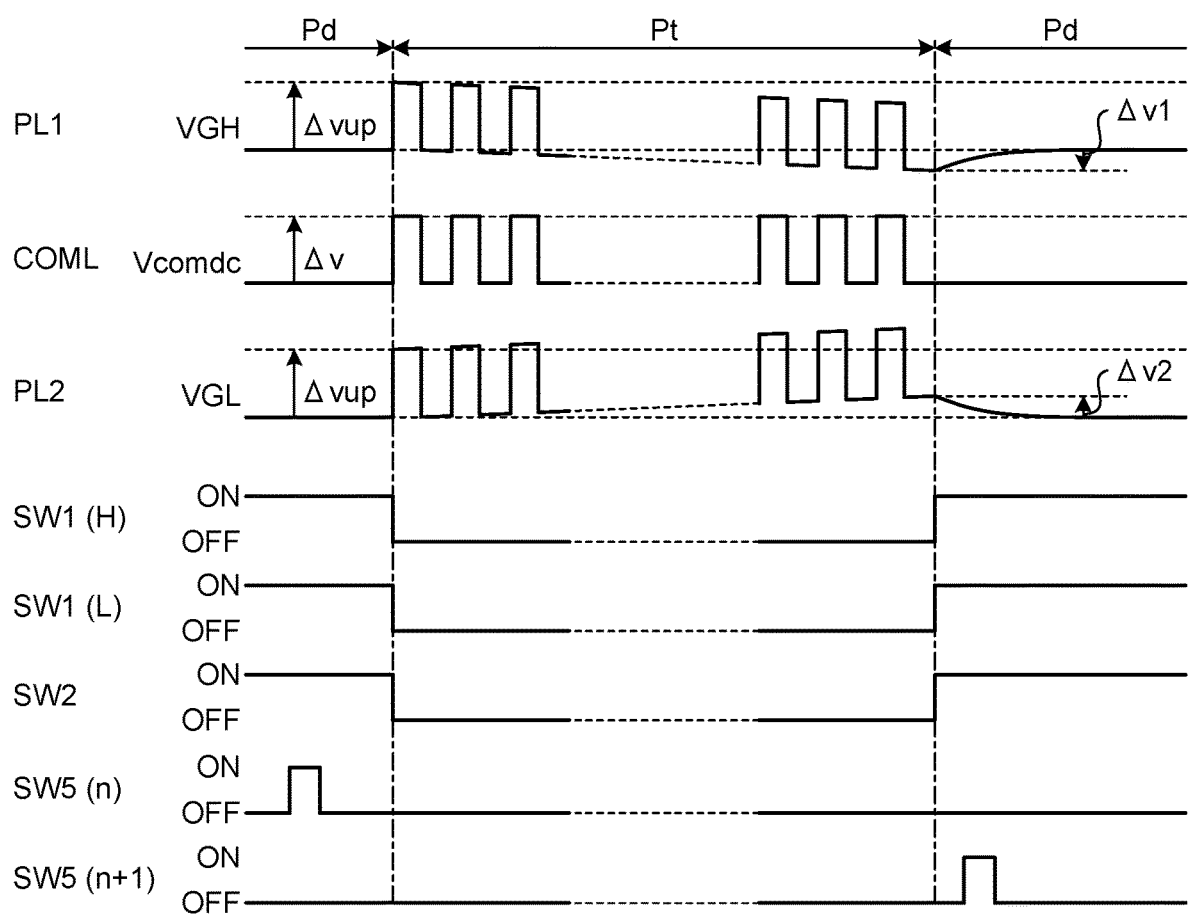
FIG. 9 is a diagram illustrating an exemplary state transition of various components' waveforms and switch circuits in the detection period.

FIG. 9 is a diagram illustrating an exemplary state transition of various components' waveforms and switch circuits when the first-potential supply line and the second-potential supply line are caused to be in a floating state in the detection period. In FIG. 9, the drive signal Vcom supplied to each drive electrode COML in the detection period Pt corresponds to the alternating-current square wave Sg illustrated in FIGS. 7 and 8. In addition, potential $\Delta v$ of a crest value of the drive signal Vcom corresponds to the voltage $V_2$ of the alternating-current square wave Sg illustrated in FIGS. 7 and 8.

As described above, in the detection period Pt, when the first-potential supply line PL1 and the second-potential supply line PL2 are brought into a floating state by the switch circuit SW1(H) of the power circuit 42, the switch circuit SW1(L) of the power circuit 42, and the switch circuits SW5 (SW5($n$) and SW5($n$+1)) of the scanning-line drive circuit 12, the drive signal Vcom is superimposed on waveforms of the first-potential supply line PL1 and the second-potential supply line PL2 due to interlayer capacitance between the supply lines and the drive electrodes COML. The interlayer capacitance include, for example, parasitic capacitance between each pixel electrode 22 and the gate of the corresponding pixel transistor Tr, and parasitic capacitance between the first-potential supply line PL1 and the second-potential supply line PL2.

Specifically, in the detection period Pt, the drive signal Vcom supplied to each drive electrode COML is superimposed on the first potential VGH of the first-potential supply line PL1, whereby the waveform of the potential of the first-potential supply line PL1 becomes a substantially square-wave waveform having a crest value at potential $\Delta vup$ corresponding to the potential $\Delta v$ of the crest value of the drive signal Vcom.

In addition, in the detection period Pt, the drive signal Vcom supplied to each drive electrode COML is superimposed on the second potential VGL of the second-potential supply line PL2, whereby the waveform of the potential of the second-potential supply line PL2 becomes a substantially square-wave waveform having a crest value at the potential $\Delta vup$ corresponding to the potential $\Delta v$ of the crest value of the drive signal Vcom.

In a case where the first-potential supply line PL1 and the second-potential supply line PL2 are caused to be in a floating state in the entire detection period Pt, the potential of the first-potential supply line PL1 decreases by $\Delta v1$ and the potential of the second-potential supply line PL2 increases by $\Delta v2$ as time elapses, because of, for example, leakage current generated between the first-potential supply line PL1 and the second-potential supply line PL2 being in a floating state.

In this process, the off-resistance of each pixel transistor Tr decreases as the potential between the gate and source of the pixel transistor Tr decreases. As electric charge stored in the pixel capacitor C electrically is discharged due to the decrease of the off-resistance of the pixel transistor Tr, luminance flickers potentially occurs between frames.

In a case where the first-potential supply line PL1 and the second-potential supply line PL2 are caused to be in a floating state in the entire detection period Pt, the potential of the first-potential supply line PL1 decreases by $\Delta v1$ and the potential of the second-potential supply line PL2 increases by $\Delta v2$ as described above. Thus, in the display period Pd immediately after the detection period Pt, even when the first potential VGH is supplied to the first-potential supply line PL1 by the switch circuit SW1(H) of the power circuit 42 and the second potential VGL is supplied to the second-potential supply line PL2 by the switch circuit SW1(L) of the power circuit 42, a return time is required until the potential of the first-potential supply line PL1 returns to the first potential VGH and the potential of the second-potential supply line PL2 returns to the second potential VGL.

In the display period Pd immediately after the detection period Pt, a scanning signal GATE (in the example illustrated in FIG. 6A, the scanning signal GATE(n+1)) has a crest value of "(VGH−Δv1)−(VGL+Δv2)", which is smaller than an assumed crest value of "VGH−VGL" by "Δv1+Δv2". Thus, in a case where the first-potential supply line PL1 and the second-potential supply line PL2 are caused to be in a floating state in the entire detection period Pt, a line synchronized with the detection period Pt may be recognized.

In the present embodiment, the detection period Pt includes a potential supply period in which the first potential VGH is supplied to the first-potential supply line PL1 and the second potential VGL is supplied to the second-potential supply line PL2, to restrain potential variation of the first-potential supply line PL1 and the second-potential supply line PL2 in the detection period Pt.

Figure 10:
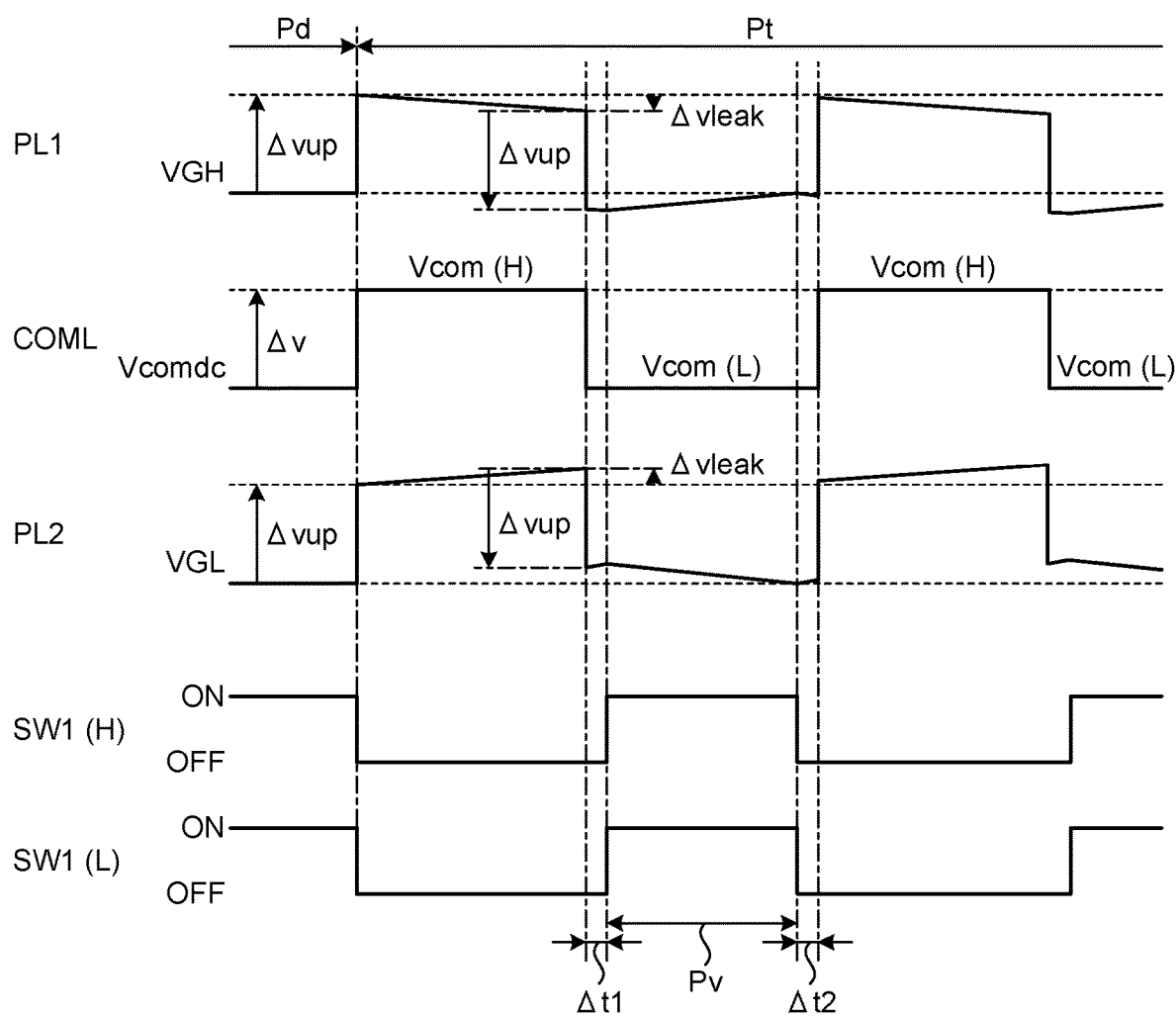
FIG. 10 is a diagram illustrating an exemplary state transition of various components' waveforms and switch circuits of the display device according to the embodiment in the detection period.

FIG. 10 is a diagram illustrating an exemplary state transition of various components' waveforms and switch circuits of the display device according to the embodiment in the detection period. In the example illustrated in FIG. 10, a low potential Vcom(L) of the drive signal Vcom in the detection period Pt is the same as the potential of the common potential Vcomdc in the display period Pd, but the present disclosure is not limited thereto.

In the present embodiment, as illustrated in FIG. 10, a potential supply period Pv is included in the period of the low potential Vcom(L) of the drive signal Vcom, in other words, in a predetermined period from a fall to a rise of the drive signal Vcom. The potential supply period Pv is a period in which the first potential VGH is supplied to the first-potential supply line PL1 through the switch circuit SW1(H) of the power circuit 42 and the second potential VGL is supplied to the second-potential supply line PL2 through the switch circuit SW1(L) of the power circuit 42. With this operation, potential variation of the first-potential supply line PL1 and the second-potential supply line PL2 in the detection period Pt can be restrained.

Specifically, in the period of a high potential Vcom(H) of the drive signal Vcom, each scanning line GCL is brought into a floating state by setting the first-potential supply line PL1 and the second-potential supply line PL2 to high impedance (Hi-Z). At this time, the potential of the first-potential supply line PL1 becomes a value (VGH+Δvup) increased from the first potential VGH by Δvup corresponding to the potential increase Δv of each drive electrode COML due to the above-described interlayer capacitors. Then, as time elapses, the potential of the first-potential supply line PL1 decreases due to, for example, leakage current generated between the first-potential supply line PL1 and the second-potential supply line PL2, and becomes a potential (VGH+Δvup−Δvleak) that is lower by a decrease amount Δvleak due to, for example, the leakage current. The potential of the second-potential supply line PL2 becomes a value (VGL+Δvup) increased from the second potential VGL by Δvup corresponding to the potential increase Δv of each drive electrode COML due to the above-described interlayer capacitors. Then, as time elapses, the potential of the second-potential supply line PL2 increases due to, for example, leakage current generated between the first-potential supply line PL1 and the second-potential supply line PL2, and becomes a potential (VGL+Δvup+Δvleak) that is higher by the increase amount Δvleak due to, for example, the leakage current.

When the drive signal Vcom becomes the low potential Vcom(L), the potential of the first-potential supply line PL1 becomes a value (VGH−Δvleak) decreased from the potential (VGH+Δvup−Δvleak) by Δvup corresponding to the potential decrease Δv of each drive electrode COML, and continuously decreases thereafter. The potential of the second-potential supply line PL2 becomes a value (VGL+Δvleak) decreased from potential (VGL+Δvup+Δvleak) by Δvup corresponding to potential decrease Δv of each drive electrode COML, and continuously increases thereafter.

In the present embodiment, as illustrated in FIG. 10, the switch circuit SW1(H) and the switch circuit SW1(L) are controlled to be turned on a predetermined minute period Δt1 after the drive signal Vcom becomes the low potential Vcom(L). With this operation, the first potential VGH is supplied to the first-potential supply line PL1 through the switch circuit SW1(H), and the second potential VGL is supplied to the second-potential supply line PL2 through the switch circuit SW1(L).

Then, in the potential supply period Pv, the potential of the first-potential supply line PL1 returns to the first potential VGH, and the potential of the second-potential supply line PL2 returns to the second potential VGL. This can restrain potential decrease Δv1 of the first-potential supply line PL1 and potential increase Δv2 of the second-potential supply line PL2 when a transition to the display period Pd is made.

In the example illustrated in FIG. 10, the switch circuit SW1(H) and the switch circuit SW1(L) are controlled to be turned off a minute period Δt2 before the drive signal Vcom becomes the high potential Vcom(H), but the minute periods Δt1 and Δt2 may be zero.

Figure 11:
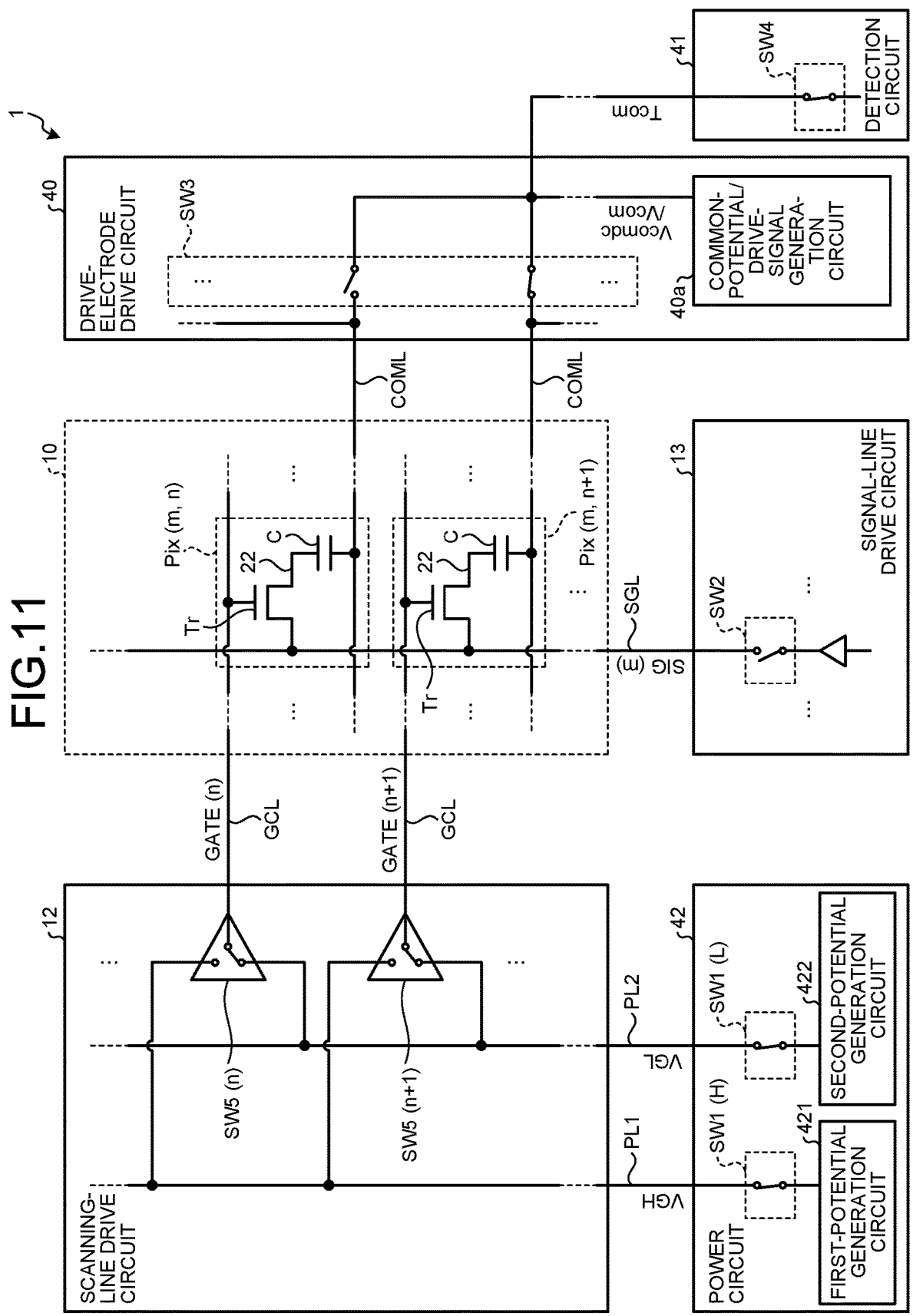
FIG. 11 is a state diagram of the display device according to the embodiment in a potential supply period in the detection period.

FIG. 11 is a state diagram of the display device according to the embodiment in the potential supply period in the detection period. As illustrated in FIG. 11, in the potential supply period Pv in the detection period Pt of the present embodiment, the first potential VGH is applied from the first-potential generation circuit 421 of the power circuit 42 to the first-potential supply line PL1 through the switch circuit SW1(H), and the second potential VGL is applied from the second-potential generation circuit 422 of the power circuit 42 to the second-potential supply line PL2 through the switch circuit SW1(L).

Figure 12:
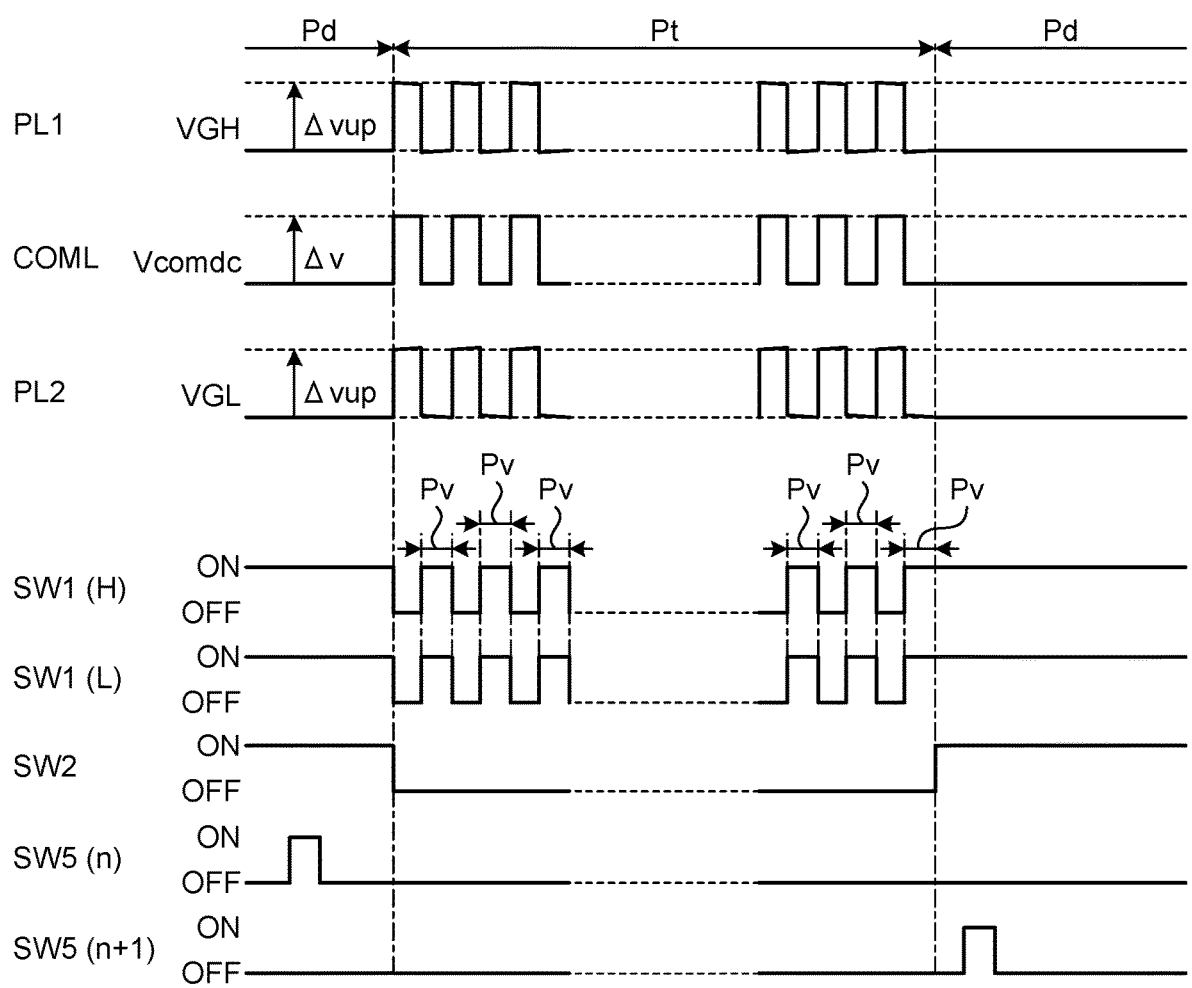
FIG. 12 is a diagram illustrating a first exemplary state transition of the various components' waveforms and the switch circuits of the display device according to the embodiment in the detection period.

FIG. 12 is a diagram illustrating a first exemplary state transition of the various components' waveforms and the switch circuits of the display device according to the embodiment in the detection period.

In the first exemplary state transition illustrated in FIG. 12, the potential supply period Pv is provided for each period of the low potential Vcom(L) of the drive signal Vcom in the entire detection period Pt.

Figure 13:
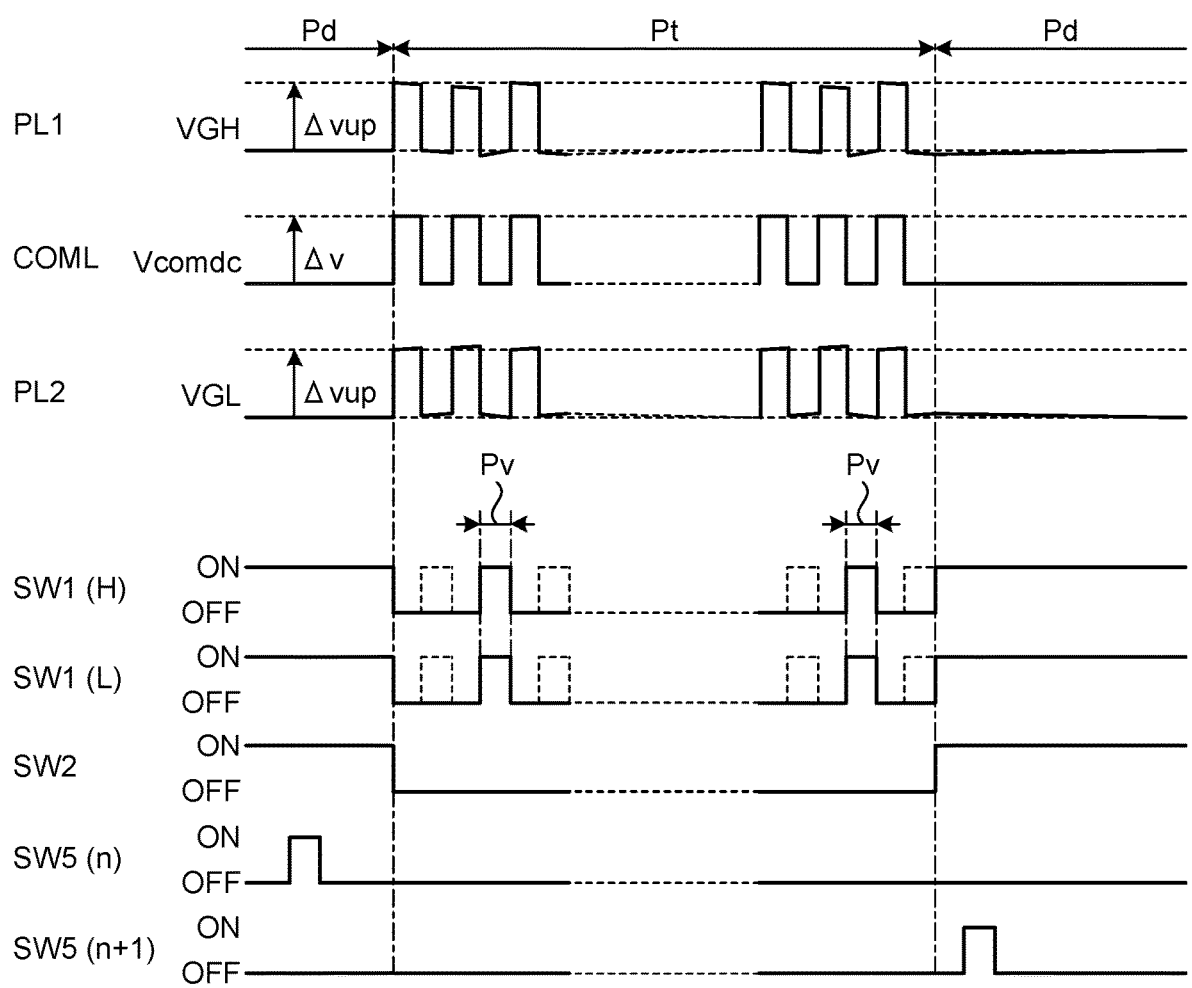
FIG. 13 is a diagram illustrating a second exemplary state transition of the various components' waveforms and the switch circuits of the display device according to the embodiment in the detection period.

FIG. 13 is a diagram illustrating a second exemplary state transition of the various components' waveforms and the switch circuits of the display device according to the embodiment in the detection period.

In the second exemplary state transition illustrated in FIG. 13, the potential supply period Pv is provided for each even-numbered period of the low potential Vcom(L) of the drive signal Vcom in the detection period Pt.

Although the potential supply period Pv is provided for each even-numbered period of the low potential Vcom(L) of the drive signal Vcom in the detection period Pt in the second exemplary state transition illustrated in FIG. 13, the potential supply period Pv may be provided for each odd-numbered period of the low potential Vcom(L) of the drive signal Vcom in the detection period Pt, or the potential supply period Pv may be provided for each predetermined number of periods of the low potential Vcom(L) in the detection period Pt.

Figure 14:
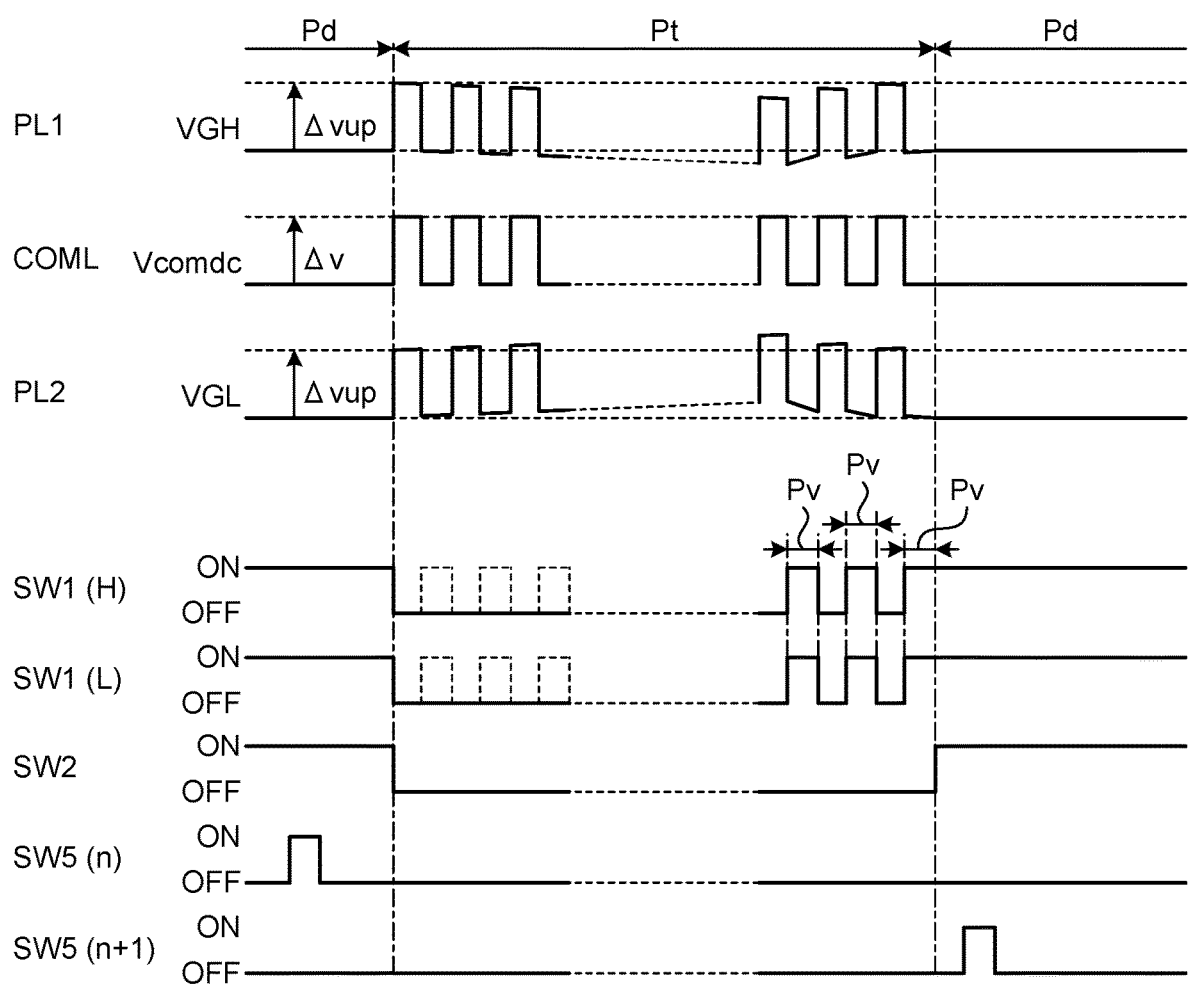
FIG. 14 is a diagram illustrating a third exemplary state transition of the various components' waveforms and the switch circuits of the display device according to the embodiment in the detection period.

FIG. 14 is a diagram illustrating a third exemplary state transition of the various components' waveforms and the switch circuits of the display device according to the embodiment in the detection period.

In the third exemplary state transition illustrated in FIG. 14, in the detection period Pt, the potential supply period Pv is provided for each of a plurality of periods of the low potential Vcom(L) of the drive signal Vcom immediately before the display period Pd. In the detection period Pt, the potential supply period Pv may be provided for each of at least one period of the low potential Vcom(L) immediately before the display period Pd.

The exemplary state transition illustrated in each of FIGS. 12 to 14 is merely exemplary. The periods of the low potential Vcom(L) of the drive signal Vcom provided with the potential supply period Pv in the detection period Pt are not limited to the examples illustrated in FIGS. 12 to 14. Specifically, for example, any configuration in which the potential supply period Pv is provided for each of at least one period of the low potential Vcom(L) of the drive signal Vcom in the detection period Pt can obtain the effect of restraining potential variation of the first-potential supply line PL1 and the second-potential supply line PL2 in the detection period Pt.

As described above, the display device 1 according to the embodiment alternately executes an operation in the display period Pd and an operation in the detection period Pt in a time division manner. The display period Pd is a period in which image display is performed in the display region 10 provided with the plurality of pixels Pix each including the pixel electrode 22 and the pixel transistor Tr, and the detection period Pt is a period in which a detection target on the display region 10 is detected. The display device 1 includes: the scanning lines GCL coupled to the gates of the pixel transistors Tr; the signal lines SGL coupled to either the sources or drains of the pixel transistors Tr; the drive electrode COML having pixel capacitors C between the drive electrode COML and the pixel electrodes 22, the pixel electrodes 22 being coupled to the other ones of the sources and drains of the pixel transistors Tr; the scanning-line drive circuit 12 configured to supply the scanning signals GATE to the scanning lines GCL; the signal-line drive circuit 13 configured to supply the pixel signals SIG to the signal lines SGL; the drive-electrode drive circuit 40 configured to supply, to the drive electrode COML, the common potential Vcomdc common to the pixel electrodes 22 in the display period Pd and supply the alternating-current drive signal Vcom to the drive electrode COML in the detection period Pt; the power circuit 42 configured to generate the first potential VGH as a reference potential for the high potential of each scanning signal GATE and the second potential VGL as a reference potential for the low potential of each scanning signal GATE, and supply the first potential VGH and the second potential VGL to the scanning-line drive circuit 12; the first-potential supply line PL1 through which the first potential VGH is supplied to the scanning-line drive circuit 12; and the second-potential supply line PL2 through which the second potential VGL is supplied to the scanning-line drive circuit 12. The power circuit 42 operates such that the potential supply period Pv is included in a low-potential period of the drive signal Vcom, the potential supply period Pv being a period in which the first potential VGH is supplied to the first-potential supply line PL1 and the second potential VGL is supplied to the second-potential supply line PL2.

Specifically, the power circuit 42 operates such that the potential supply period Pv is provided for each of at least one period of the low potential Vcom(L) of the drive signal Vcom in the detection period Pt.

Alternatively, the power circuit 42 operates such that the potential supply period Pv is provided for each predetermined number of periods of the low potential Vcom(L) of the drive signal Vcom in the detection period Pt.

Alternatively, the power circuit 42 operates such that the potential supply period Pv is provided for each period of the low potential Vcom(L) of the drive signal Vcom in the entire detection period Pt.

In the above-described configuration, the power circuit 42 sets the first-potential supply line PL1 and the second-potential supply line PL2 to high impedance in the detection period Pt except for the potential supply period Pv.

The above operation restrains potential variation of the first-potential supply line PL1 and the second-potential supply line PL2 in the detection period Pt, thereby reducing the occurrence of luminance flickers between frames in the detection period Pt that would otherwise be caused by discharge of electric charge stored in the pixel capacitor C resulting from decrease in the off-resistance of the pixel transistor Tr caused by decrease of the potential between the gate and source of the pixel transistor Tr due to, for example, leakage current generated between the first-potential supply line PL1 and the second-potential supply line PL2. In addition, it is possible to inhibit the crest value of the scanning signal GATE from decreasing and a line synchronized with the detection period Pt from being recognized.

According to the present embodiment, it is possible to obtain the display device 1 that can restrain deterioration of display quality.

Although the above-described embodiment exemplarily describes a configuration for performing the touch detection operation by using the self-capacitance touch detection, the present disclosure is also applicable to a configuration for performing a touch detection operation by using what is called mutual capacitive touch detection in which touch detection is performed in accordance with change of capacitance between a drive electrode and a detection electrode due to proximity or contact of an external object such as a finger.

The preferable embodiment of the present disclosure is described above, but the present disclosure is not limited to such an embodiment. Contents disclosed in the embodiment are merely exemplary and may be modified in various kinds of manners without departing from the scope of the present disclosure. Modifications performed as appropriate without departing from the scope of the present disclosure belong to the technical scope of the present disclosure.

What is claimed is:

1. A display device configured to alternately execute an operation in a display period and an operation in a detection period in a time division manner, the display period being a period in which image display is performed in a display region provided with a plurality of pixels each including a pixel electrode and a pixel transistor, the detection period being a period in which a detection target on the display region is detected, the display device comprising:
   scanning lines coupled to gates of the pixel transistors;
   signal lines coupled to either sources or drains of the pixel transistors;
   a drive electrode having pixel capacitors between the drive electrode and the pixel electrodes, the pixel electrodes being coupled to the other ones of the sources and drains of the pixel transistors;
   a scanning-line drive circuit configured to supply scanning signals to the scanning lines;
   a signal-line drive circuit configured to supply pixel signals to the signal lines;

a drive-electrode drive circuit configured to supply, to the drive electrode, a common potential common to the pixel electrodes in the display period and supply an alternating-current drive signal to the drive electrode in the detection period;

a power circuit configured to generate a first potential as a reference potential for a high potential of each scanning signal and a second potential as a reference potential for a low potential of each scanning signal, and supply the first potential and the second potential to the scanning-line drive circuit;

a first-potential supply line through which the first potential is supplied to the scanning-line drive circuit; and a second-potential supply line through which the second potential is supplied to the scanning-line drive circuit, wherein the power circuit operates such that a potential supply period is included in a low-potential period of the drive signal, the potential supply period being a period in which the first potential is supplied to the first-potential supply line and the second potential is supplied to the second-potential supply line, and the power circuit sets the first-potential supply line and the second-potential supply line to high impedance in the detection period except for the potential supply period.

2. The display device according to claim 1, wherein the power circuit operates such that the potential supply period is provided for each of at least one low-potential period in the detection period.

3. The display device according to claim 2, wherein the power circuit operates such that the potential supply period is provided for each predetermined number of the low-potential periods in the detection period.

4. The display device according to claim 2, wherein the power circuit operates such that the potential supply period is provided for each low-potential period in the entire detection period.

5. The display device according to claim 1, wherein the scanning-line drive circuit sets the scanning line to high impedance in the detection period.

6. The display device according to claim 1, wherein the signal-line drive circuit sets the signal line to high impedance in the detection period.

* * * * *